United States Patent
Ibe

(10) Patent No.: US 8,111,841 B2
(45) Date of Patent: Feb. 7, 2012

(54) AUDIO INPUT/OUTPUT DEVICE AND METHOD FOR SWITCHING INPUT/OUTPUT FUNCTIONS

(75) Inventor: Yukiyasu Ibe, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 1239 days.

(21) Appl. No.: 11/585,953

(22) Filed: Oct. 25, 2006

(65) Prior Publication Data

US 2007/0098184 A1     May 3, 2007

(30) Foreign Application Priority Data

Oct. 26, 2005   (JP) ................. 2005-310677

(51) Int. Cl.
*H03G 3/00* (2006.01)
(52) U.S. Cl. ........... 381/107; 381/111; 381/123; 710/15
(58) Field of Classification Search ............ 381/83, 381/71.4, 71.7, 71.8, 71.11, 73.1, 74, 79, 381/81, 93, 91, 92, 94.1, 94.5, 94.7, 95, 102, 381/103, 104, 107, 123, 111; 379/45, 406.01–406.16, 392.01, 419–430; 710/14, 15; 439/231; 704/E15.001, E15.003, 704/E15.004, E15.046, E15.047, E15.038, 704/E17.014, E17.002, E17.009, E17.011, 704/233, 269, 246, 251, E19.005; 455/575.2, 455/556.1
See application file for complete search history.

(56) References Cited

U.S. PATENT DOCUMENTS

| | | | |
|---|---|---|---|
| 6,597,786 B1* | 7/2003 | Lin | 379/388.02 |
| 2005/0071158 A1* | 3/2005 | Byford | 704/233 |
| 2006/0153394 A1* | 7/2006 | Beasley | 381/57 |

FOREIGN PATENT DOCUMENTS

| | | |
|---|---|---|
| JP | 2001-195100 | 7/2001 |
| JP | 2002-8798 | 1/2002 |
| JP | 2002008798 A * | 1/2002 |

OTHER PUBLICATIONS

English abstract of Japanese publication No. 2001-195100.
English abstract of Japanese publication No. 2002-8798.

* cited by examiner

*Primary Examiner* — Vivian Chin
*Assistant Examiner* — Leshui Zhang
(74) *Attorney, Agent, or Firm* — Young & Thompson

(57) ABSTRACT

Using a 4-pin audio jack, 3-pin signal interfaces including the ground interface are assigned with conventionally used earphone/microphone functions (one microphone input and one speaker output), while the other interface corresponding to the fourth pin is assigned with a function of microphone input for voice recognition in high noise environment. This function is made effective only when a connected audio device requires such function.

8 Claims, 3 Drawing Sheets

US 8,111,841 B2

AUDIO INPUT/OUTPUT DEVICE AND METHOD FOR SWITCHING INPUT/OUTPUT FUNCTIONS

This application claims priority to prior Japanese patent application JP 2005-310677, the disclosure of which is incorporated herein by reference.

BACKGROUND OF THE INVENTION

The present invention relates to an audio input/output device designed to support operations of various audio device by means of a single audio jack, and a method for switching input/output functions of such an audio input/output device. The present invention is for example applicable to a small-sized portable information terminal.

The improvement of voice recognition techniques in recent years induces the need for a terminal having both a microphone input function to input voice and a speaker output function to feed back a voice recognition result to a user.

There has been proposed various solutions in relation to the input of voice, which require input from two microphones for accurate recognition of voice input in high-noise environment, namely, a microphone for collecting voice and a microphone for collecting surrounding noise. These solutions are believed to become more notable and useful in various occasions of using voice recognition.

In such solutions for voice recognition and occasions of using the same as described above, the terminal is required to have audio input/output functions realized by at least two microphones for input and at least one speaker for output.

When the solution is employed in a laptop computer having a physically large size, for example, it is possible to mount therein interfaces and circuits for respective input/output functions including, for example, stereo headphone output and stereo microphone input.

Such conventional technique is disclosed, for example, in Japanese Laid-Open Patent Publication Nos. 2001-195100 and 2002-8798.

However, according to the conventional techniques, it is physically difficult to mount a plurality of jack interfaces in small-sized portable information terminals represented by PDA or the like. An information terminal such as PDA typically has a single interface for a headphone, or an earphone microphone.

In order to realize accurate voice recognition in high-noise environment, the information terminal is required to have a plurality of audio jack interfaces having a microphone input function for collecting voice, a microphone input function for collecting surrounding noise, and a speaker output function for feeding back a voice recognition result to the user. This induces a problem of increase in the size of the terminal. In order to solve the problem relating to the terminal size, operations of various audio devices must be supported by a single audio jack.

In this case, the audio interface of the information terminal must be supplied with electrical signals from four different pins including GND (ground) pin. The input/output functions as described above can be realized by employing a 4-pin audio jack which has already been commercialized.

However, even for a small-sized information terminal provided with this type of 4-pin audio jack, it is necessary to assume that the information terminal is connected to other equipment than a headset which is used for accurate voice recognition in high-noise environment, such as a regular 3-pin audio device or a 4-pin audio device having a special signal. It is also necessary to prevent the basic voice input/output functions from being damaged.

The environment in which the headset for realizing accurate voice recognition in high-noise environment is used is obviously high-noise environment. Therefore, when the headset is used with a same output volume as that for a regular audio device, the surrounding noise sometimes makes it difficult for the user to hear the sound no matter how near the sound source is. Additionally, the user is required to manually change the setting of sound output volume between when using the headset and when using a regular audio device. This poses a problem to the user because such manual operation is troublesome.

SUMMARY OF THE INVENTION

It is therefore an object of the present invention to provide an audio input/output device for use in a small-sized portable IT terminal such as PDA and capable of supporting operations of various audio devices by means of a single audio jack, and a method for switching input/output functions of such an audio input/output device.

It is another object of the present invention to provide an audio input/output device capable of setting an output volume according to each audio device connected thereto even in a high-noise environment, and a method for switching input/output functions of such an audio input/output device.

In order to achieve the objects above, the invention disclosed herein contemplates configurations as described below in summary.

A first aspect of the present invention relates to an audio input/output device including: a 4-pin audio interface for connecting a headset plug connected, the 4-pin audio interface including a voice input, an external noise input, and a speaker output for feeding back the input voice; a 4-pin audio jack having a detection pin to recognize the type of the headset; a selector switch for turning ON and OFF the input of a fourth-pin signal from the external noise input; a control unit for controlling the selector switch; and an audio CODEC having a voice input terminal, an external noise input terminal, and a speaker output terminal corresponding to the voice input, the external noise input, and the speaker output, respectively. The audio CODEC receives a headset recognition signal from the detection pin, and performs processing to increase the output volume controlled by the audio CODEC within a predetermined range.

A second aspect of the present invention relates to a method for switching input/output functions in an audio input/output device including a 4-pin audio jack having an 4-pin audio interface and a detection pin for recognizing a headset, a selector switch for turning ON and OFF the connection of a fourth-pin external noise input signal, a control unit for controlling the selector switch, and an audio CODEC for controlling the speaker output volume, and the method includes the steps of: entering selection information onto software to select which one is to be used, a headset for realizing accurate voice recognition in high noise environment or a 3-pin audio device; turning the selector switch ON when selection information to select the use of the headset is entered; detecting the signal state at the detection pin with the audio CODEC; and increasing automatically the speaker output volume with the audio CODEC when the connection of the headset is detected from the signal state at the detection pin.

DESCRIPTION OF THE PREFERRED EMBODIMENTS

A preferred embodiment of the present invention will be described with reference to the accompanying drawings. In order to support the headset function for realizing accurate voice recognition in high noise environment, the present invention employs a 4-pin audio jack, which communicates, between a headset 10 and an IT terminal, four different signals consisting of two microphone input signals corresponding to first and second microphones 2 and 3, a speaker output signal corresponding to a speaker 1, and a GND (ground) signal 25.

Figure 3:
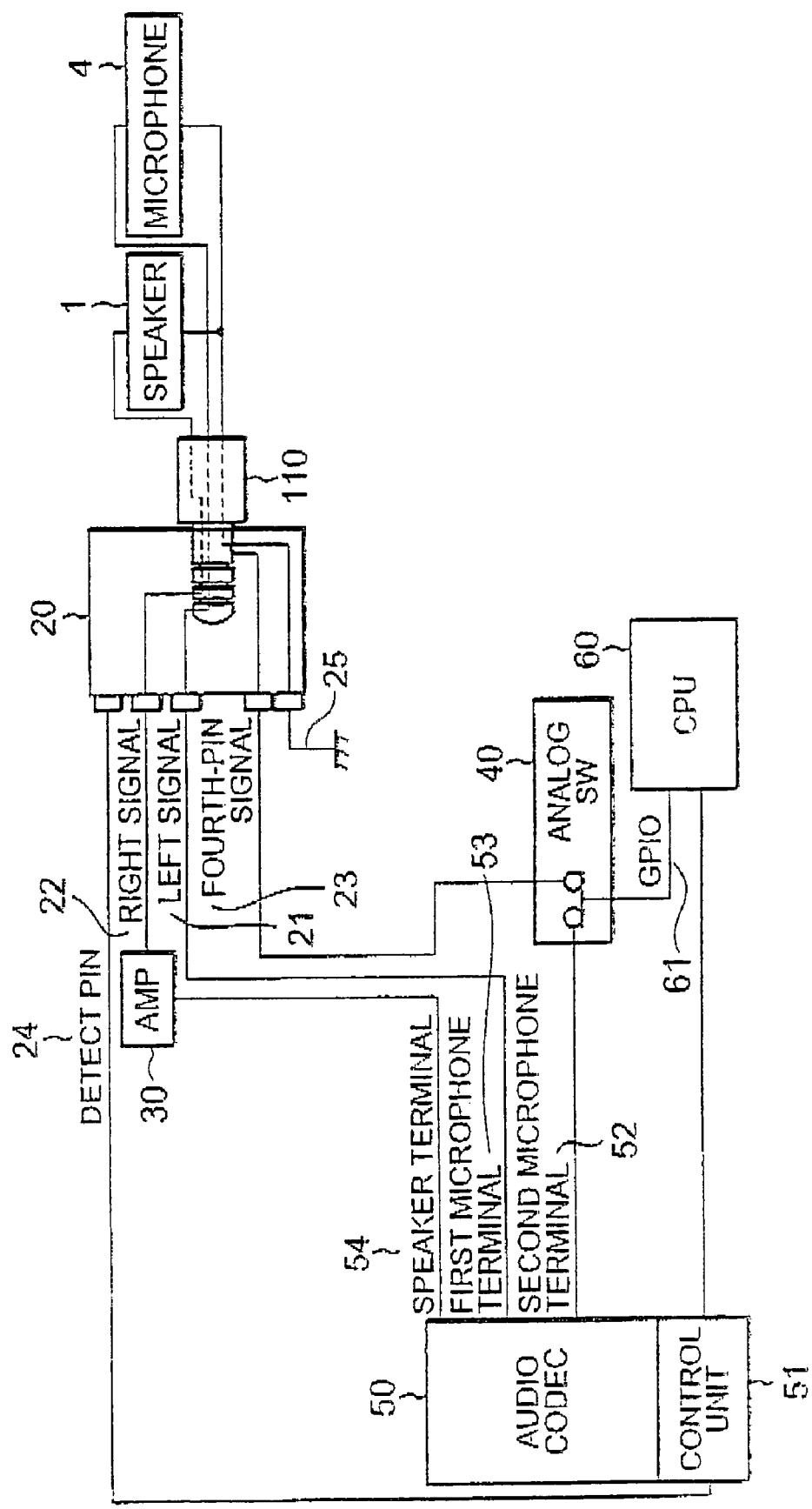
FIG. 3 is a block diagram showing configuration of the audio input/output device when a 3-pin audio device is selected.

As shown in FIG. 3, this 4-pin audio jack is designed connectable to a regular 3-pin audio device (plug) 110 as well. The headset function is preliminarily established by connecting, to three pins of the audio jack, a microphone input corresponding to a microphone 4, a speaker output corresponding to a speaker 1, and the GND 25 which is connected on the IT terminal side.

The remaining fourth pin (hereafter referred to as the "fourth pin") is assigned to a second microphone input corresponding to a second microphone 3 that is required by the headset 10 for realizing accurate voice recognition in high noise environment. When a regular audio device is connected to the audio jack in which the headset function has been established by connecting this second microphone input line on the IT terminal side, there exists no audio source serving as the source of signals to be input. Therefore, an audio CODEC 50 and OS application software must be set not to use the headset function described above.

When an input signal source that is not an audio source, for example a digital signal is connected to the fourth pin as in a special audio device, the signal source may cause a noise input. Furthermore, there may be a risk that the circuitry within the IT terminal is damaged by art input from the signal source.

Therefore, the signal connection to the fourth pin is designed to be switchable between ON and OFF by an analog SW (selector switch) 40 so that the function of the headset 10 for realizing accurate voice recognition in high noise environment is made effective only when it is used.

Desirably, the analog SW 40 can be turned ON and OFF by software installed in the information terminal as well as by the user's intention. The analog SW 40 is desirably controlled and made switchable by a GPIO 61 which is preliminarily provided in a CPU 60 or the like. GPIO stands for general-purpose input/output, and the GPIO 61 is a terminal which is capable of arbitrarily setting the input/output direction, changing the output state and detecting the input state according to the software. The GPIO 61 can also be operated through a network.

When the audio jack is connected to an audio device other than the headset used for realizing accurate voice recognition in high noise environment, the analog SW 40 can be set OFF to establish a condition within the IT terminal in which the signal pin corresponding to the fourth-pin signal 23 is not connected to the audio CODEC 50.

Further, when the headset 10 is used for realizing accurate voice recognition in high noise environment, the analog SW 40 is set ON in order to increase the output volume higher than that for a regular audio device. When the audio CODEC 50 recognizes the connection of the headset 10 for realizing accurate voice recognition in high noise environment to the audio jack, the control is performed in the audio CODEC 50 to increase the output volume within a predetermined range.

Figure 1:
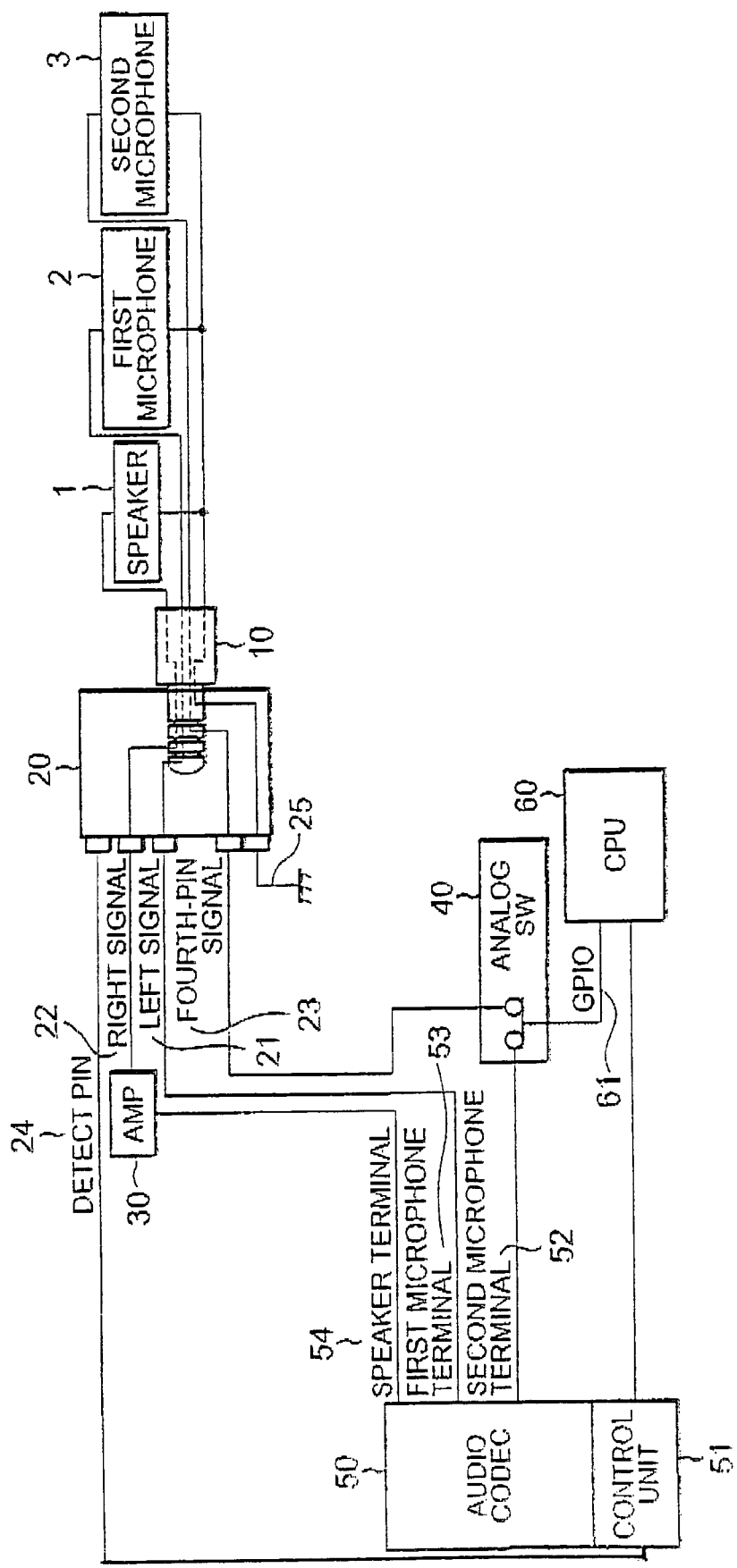
FIG. 1 is a block diagram showing configuration of an audio input/output device when a headset is selected.

As shown in FIG. 1, the audio input/output device is composed of the 4-pin audio jack 20 to which a plug of the headset 10 for realizing accurate voice recognition in high noise environment is connected, an AMP (signal amplifier) 30, the analog SW 40 for turning ON and OFF the connection of the microphone input to the fourth-pin signal 23 of the audio jack 20, the audio CODEG 50, and the CPU 60. The headset 10 is one of audio devices.

The audio jack 20 has a LEFT signal 21, a RIGHT signal 22, and a GND 25 connected to the audio CODEC 50 via the AMP 30 or the like to provide audio input/output functions of a regular 3-pin audio device.

The analog SW 40 is connected to the fourth-pin signal 23 of the audio jack, and also to a second microphone terminal 52 of the audio CODEC 50.

The GPIO 61 is connected from the CPU 60 to the analog SW 40 to turn the analog SW 40 ON and OFF. The analog SW 40 can be turned ON and OFF by operation of the GPIO 61.

The audio jack 20 additionally has a DETECT pin 24 for recognizing the connection of an audio device. The DETECT pin 24 is connected to a control unit 51 of the audio GODEC 50.

The audio CODEC 50 and the CPU 60 are electrically connected. The audio CODEC 50 is capable of receiving a command from the CPU 60 to change the audio output volume according to the state of the DETECT pin 24 connected to the control unit 51 of the audio CODEC 50.

A description will be made of operation of the audio input/output device according to the present invention. As shown in FIG. 1, the audio input/output device has four audio interfaces in total: one for the voice input, one for the external noise (noise) input, one for the output to feed back the input voice, and one for the GND line. FIG. 1 shows the condition in which the headset 10 designed to realize accurate voice recognition in high noise environment is connected to the audio input/output device.

Figure 2:
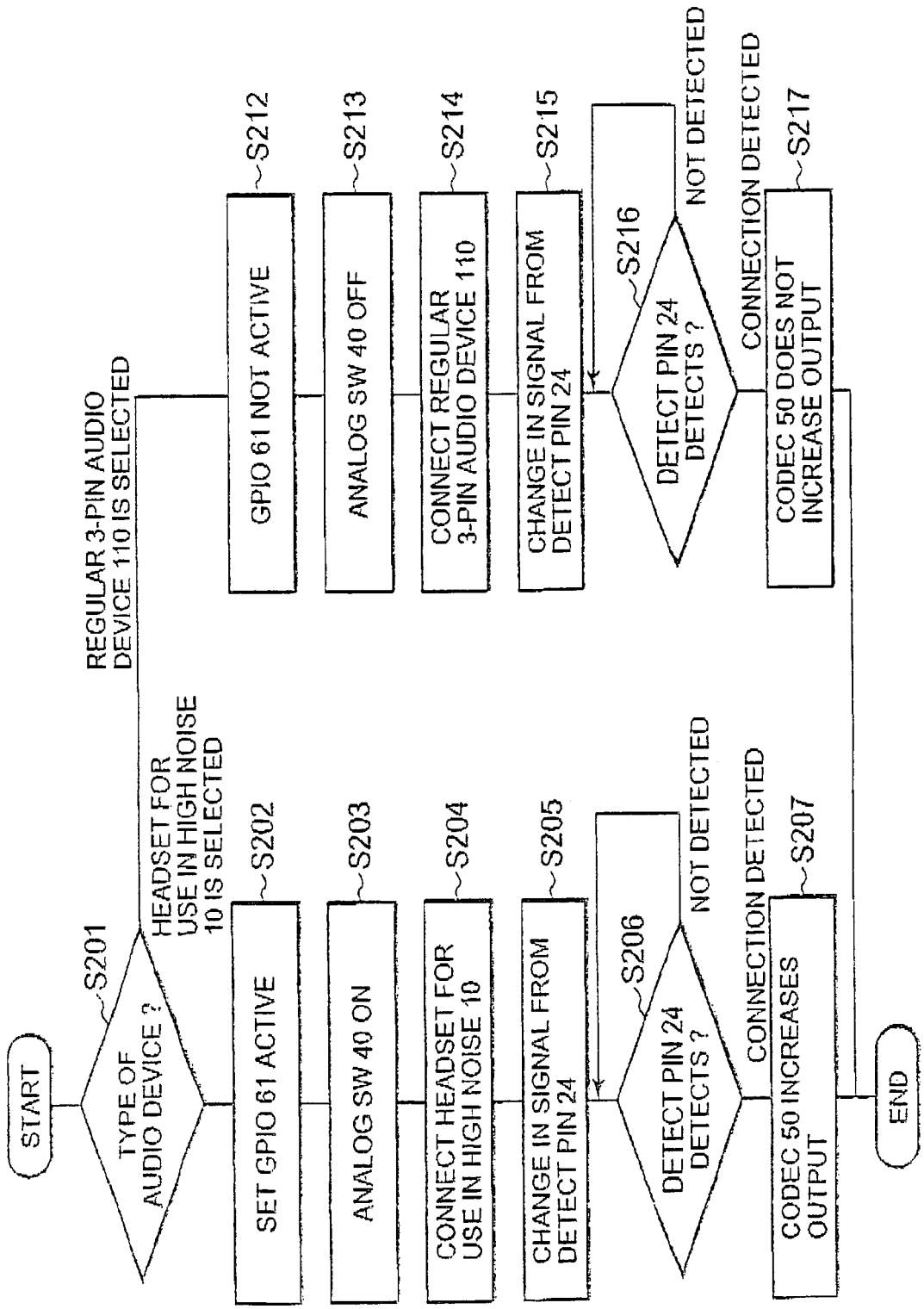
FIG. 2 is a flowchart for explaining a method for switching input/output functions according to the present invention.

As shown in the flowchart of FIG. 2, the user first selects, by means of application software installed in the IT terminal, either the use of the headset 10 designed to realize accurate voice recognition in high noise environment, or the use of a regular 3-pin audio device (start-up selection) (step S201).

When the user selects the use of the headset 10 designed to realize accurate voice recognition in high noise environment, the CPU 60 controls the GPIO 61 active (step S202), and turns the analog SW 40 ON (step S203).

The fourth-pin signal 23 of the audio jack 20 is thus signal-connected (electrically connected) to the second microphone terminal 52 of the audio CODEC 50 via the analog SW 40 as shown in FIG. 1.

Subsequently, the headset 10 designed to realize accurate voice recognition in high noise environment is connected to the audio jack 20 (step S204).

This connection of the headset 10 changes the signal state at the DETECT pin 24 of the audio jack 20 (step S205).

Under this condition, as shown in FIG. 1, the audio jack 20 is connected to the audio CODEC 50 with the LEFT signal 21 being connected to a first microphone terminal 53 of the audio CODEC 50, the RIGHT signal 22 being connected to a speaker terminal 54, and the fourth-pin signal 23 being connected to a second microphone terminal 52. This enables the establishment of both the functions, namely the two-microphone input function and the one-speaker output function, which characterizes the headset 10 designed to realize accurate voice recognition in high noise environment.

Further, the audio CODEC 50 detects the signal state at the DETECT pin 24 of the audio jack 20 (step S206).

When the audio device is connected and the start-up selection has been made by means of the application software installed in the IT terminal to use the headset 10 designed to realize accurate voice recognition in high noise environment, the speaker output volume is automatically increased by the control function of the audio CODEC 50 (step S207).

Thus, the speaker output volume is automatically raised when the headset 10 designed to realize accurate voice recognition in high noise environment is connected for complete use of the function thereof.

In contrast, when a regular 3-pin audio device 110 is connected, the connection assumes the condition as shown in FIG. 3. Specifically, the condition in which the 3-pin audio device 110 is connected corresponds to the case when the headset 10 designed to realize accurate voice recognition in high noise environment is not selected as the audio device to be used, in step S201 in the flowchart of FIG. 2. Processing steps of step S212 to step S217 are then implemented. These processing steps will be described sequentially. When the headset 10 is not selected in step S201, the GPIO 61 is not controlled active by the CPU 60 (step S212). Accordingly, the analog SW 40 is turned OFF (step S213).

The regular 3-pin audio device 110 is then connected (step S214). This changes the signal state at the DETECT pin 24 of the audio jack 20 (step S215).

The audio CODEC 50 further senses (detects) the signal state at the DETECT pin 24 of the audio jack 20 (step S216). Since the use of the headset 10 has not been selected, the audio CODEC 50 does not change the speaker output volume (step S217).

A description will be made of other preferred embodiments of the present invention. The above description of the first embodiment and the operation thereof has been made in terms of the case in which the LEFT signal 21 and the audio signal (fourth-pin signal 23) connected to the analog SW are input signals, and the RIGHT signal 22 is an output signal. The present invention can be implemented even if these combinations of the signals are changed.

For example, the present invention can be implemented easily if the circuit is preliminarily designed such that the audio signal connected to the analog SW is an output signal, and the LEFT signal and the RIGHT signal are input signals.

Although the GPIO is controlled by the CPU in the first embodiment, the GPIO can be controlled by other devices than the CPU, and the present invention can be implemented easily even if the CPU is replaced with another device.

It should be understood that the foregoing relates to only preferred embodiments of the present invention, and that various changes and modifications may be made in the invention without departing from the spirit and scope of the invention.

As described above, the present invention is able to provide an audio circuitry which makes it possible to obtain the operation mode to use two input lines and one output line only when necessary, while using the 4-pin audio jack.

This makes it possible to take advantage of the characteristics of the headset which is capable of accurate voice recognition in high noise environment. This also enables a regular audio device to provide its functions and operation in the same manner as when it is employed according to the prior art.

In addition, the binarization of the audio output volume makes it possible to automatically switch the output volume between the headset capable of accurate voice recognition in high noise environment and an audio device other than that. This allows the user to select an audio device he/she wants to use on the application software without changing the settings, and to obtain appropriate and comfortable audio output only by connecting the audio device.

What is claimed is:

1. An audio input/output device for use in combination with a headset for accurate voice recognition in high noise environment, the audio input/output device comprising:
    a 4-pin audio jack comprising a 4-pin audio interface for connection of a plug of the headset and a detection pin to recognize the connection of the headset, the 4-pin audio interface including a voice input, an external noise input, and a speaker output for feeding back the voice input;
    an audio CODEC having a voice input terminal, an external noise input terminal, and a speaker output terminal corresponding to the voice input, the external noise input, and the speaker output, respectively;
    a selector switch for turning ON and OFF an input of a fourth-pin signal from the external noise input to the external noise input of the audio CODEC; and
    a control unit for controlling the selector switch,
    wherein the control unit turns the selector switch ON only upon the use of the headset being selected,
    wherein, upon the audio CODEC receiving a headset recognition signal from the detection pin, the audio CODEC performs processing to increase volume of the speaker output controlled by the audio CODEC within a predetermined range, and
    wherein the control unit turns the selector switch ON and outputs a command to the audio CODEC to increase the volume of the speaker output according to a magnitude of a noise from the external noise input, only upon the use of the headset.

2. The audio input/output device according to claim 1, wherein the voice input, the speaker output and the ground of the audio jack have audio input/output functions for a 3-pin audio device.

3. The audio input/output device according to claim 1, wherein a GPIO is connected to the selector switch from the control unit so that the selector switch is turned ON and OFF by the GPIO.

4. A method for switching input/output functions in an audio input/output device for use in combination with a headset for accurate voice recognition in high noise environment, the method comprising:
    recognizing the connection of the headset via a 4-pin audio jack comprising a 4-pin audio interface for connection of a plug of the headset and a detection pin, the 4-pin audio interface including a voice input, an external noise input, a speaker output for feeding back the voice input;
    controlling a selector switch by turning ON and OFF an input of a fourth-pin signal from an external noise input to the external noise input of the audio CODEC having a voice input terminal, the external noise input terminal, and a speaker output terminal corresponding to the voice input, the external noise input, and the speaker output, respectively;
    entering selection information into the control unit by software to select which one is to be used, the headset or a 3-pin audio device;
    turning, in the control unit, the selector switch ON upon selection information to select the use of the headset being entered into the control unit;
    detecting, in the control unit, a signal state at the detection pin; and increasing, in the audio CODEC, volume of the speaker output according to a magnitude of a noise from the external noise input upon the connection of the headset being detected from a signal state at the detection pin.

5. The method for switching input/output functions according to claim 4, further comprising the step of the control unit turning the selector switch OFF upon the selection information to select the use of the headset not being entered into the control unit.

6. The method for switching input/output functions according to claim 4, wherein the selector switch is turned OFF upon selection information to select the use of the 3-pin audio device is entered into the control unit, and the volume of the speaker output not being changed upon the connection of the 3-pin audio device being detected from an output signal state at the detection pin.

7. The method for switching input/output functions according to claim 5, wherein the 4-pin audio interface includes the voice input, the external noise input, the speaker output, and a GND (ground).

8. The method for switching input/output functions according to claim 6, wherein the 4-pin audio interface includes the voice input, the external noise input, the speaker output, and a GND (ground).

* * * * *